(12) United States Patent
Yoon

(10) Patent No.: US 11,569,862 B1
(45) Date of Patent: Jan. 31, 2023

(54) CARD ACCOMMODATION CELL PHONE CASE FOR FOLDABLE CELL PHONE

(71) Applicant: Gwanggyu Yoon, Paju-si (KR)

(72) Inventor: Gwanggyu Yoon, Paju-si (KR)

( * ) Notice: Subject to any disclaimer, the term of this patent is extended or adjusted under 35 U.S.C. 154(b) by 0 days.

(21) Appl. No.: 17/514,090

(22) Filed: Oct. 29, 2021

(30) Foreign Application Priority Data

Aug. 19, 2021 (KR) ........................ 10-2021-0109682

(51) Int. Cl.
*H04B 1/3888* (2015.01)
*H04M 1/04* (2006.01)
*H04M 1/02* (2006.01)
*H04M 1/21* (2006.01)

(52) U.S. Cl.
CPC .......... *H04B 1/3888* (2013.01); *H04M 1/026* (2013.01); *H04M 1/04* (2013.01); *H04M 1/21* (2013.01)

(58) Field of Classification Search
CPC ...... H04B 1/3888; H04M 1/026; H04M 1/04; H04M 1/21
See application file for complete search history.

(56) References Cited

U.S. PATENT DOCUMENTS

| | | | | |
|---|---|---|---|---|
| 8,433,377 B1 * | 4/2013 | Oh | ........................ | G06F 1/1628 455/575.8 |
| 8,700,107 B1 * | 4/2014 | Oh | ........................ | H04M 1/035 381/322 |
| 10,064,298 B2 * | 8/2018 | Cavenagh | ............ | H05K 5/0004 |
| 10,790,869 B1 * | 9/2020 | Loh | ...................... | H04M 1/0214 |
| 2002/0104769 A1 * | 8/2002 | Kim | ...................... | G06F 1/1681 206/320 |
| 2003/0043095 A1 * | 3/2003 | Silverbrook | ........... | G06Q 50/00 345/87 |
| 2007/0057004 A1 * | 3/2007 | Butler | .................. | A45C 11/182 224/680 |
| 2007/0251983 A1 * | 11/2007 | Freeze | .................. | A61J 7/0069 229/125.125 |
| 2010/0230301 A1 * | 9/2010 | Fellig | ...................... | H04M 1/04 206/232 |
| 2012/0168483 A1 * | 7/2012 | Jambunathan | ......... | A45C 11/00 224/576 |
| 2013/0331155 A1 * | 12/2013 | Tages | .................... | H04M 1/185 455/575.8 |
| 2014/0066142 A1 * | 3/2014 | Gipson | ................ | H04B 1/3888 455/575.8 |
| 2014/0370946 A1 * | 12/2014 | Daniell | ............... | H04M 1/0283 455/575.8 |
| 2018/0037016 A1 * | 2/2018 | Kim | ........................ | B29C 63/02 |

(Continued)

OTHER PUBLICATIONS

D1—Z Flip case cover sold by TOPSEM on Amazon at https://www.amazon.com/Samsung-Galaxy-Compatible-Ultra-Thin-Protection/dp/B08Y8VX3P8/ref=psdc_493964_t2_B08PBMMTVD?th=1 Date-First-Available: Mar. 8, 2021 (Year: 2021).*

(Continued)

*Primary Examiner* — Jinsong Hu
*Assistant Examiner* — Rui M Hu
(74) *Attorney, Agent, or Firm* — Sughrue Mion, PLLC

(57) ABSTRACT

Disclosed is a card accommodation cell phone case including a card accommodation portion recessed by a certain depth from an inner surface of a lower body portion with the same shape as a card to be accommodated and in which a card inlet is formed at a position coming into contact with an upper body portion.

4 Claims, 13 Drawing Sheets

(56) References Cited

U.S. PATENT DOCUMENTS

| | | | |
|---|---|---|---|
| 2020/0052733 A1* | 2/2020 | Yang | A45C 11/182 |
| 2020/0128116 A1* | 4/2020 | Jang | H04M 1/0243 |
| 2021/0154096 A1* | 5/2021 | Tille | A61J 7/0436 |
| 2022/0166456 A1* | 5/2022 | Dannenberg | A45C 13/005 |

OTHER PUBLICATIONS

D2—Z Flip 3 case cover sold by LBYZCASE at https://www.amazon.com/LBYZCASE-Samsung-Leather-Shockproof-Protective/dp/B09J38691M/ref=sr_1_3?crid=9AE1J1UKU1XL&keywords=LBYZCASE%2BSamsung%2BGalaxy%2BZ%2BFlip%2B3%2BCase& qid=1658330388&sprefix=lbyzcase%2Bsamsung%2Bga Date-First-Available: Apr. 21, 2021 (Year: 2021).*

\* cited by examiner

CARD ACCOMMODATION CELL PHONE CASE FOR FOLDABLE CELL PHONE

CROSS-REFERENCE TO RELATED APPLICATION

This application claims priority to and the benefit of Korean Patent Application No. 10-2021-0109682 filed Aug. 19, 2021, the disclosure of which is incorporated herein by reference in its entirety.

BACKGROUND

1. Field of the Invention

The present invention relates to a card accommodation cell phone case, and more particularly, to a card accommodation cell phone case including a structure applicable to a foldable cell phone.

2. Discussion of Related Art

Generally, a portable device is a telephonic device which is easily used while being carried by a user and actually carried by modern people as a nearly essential item. A front display of the portable device is manufactured using a glass substrate. Here, the front display being damaged by dropping the portable device occurs consistently. Accordingly, there is a problem that the user has to spend time and money to replace the front display.

Accordingly, cases for protecting a portable device such as a smart phone, a tablet personal computer (PC), and the like have appeared. Recently, in addition to being used for simple protection, cases have been used for creating a variety of functions and designs.

Also, recently, it has been a trend to develop foldable portable devices to which a flexible display using a plastic substrate is applied instead of a glass substrate. The flexible display is an item which retains flexibility to be folded or bent in a desired shape while implementing the same image quality.

In addition, the flexible display is strong against impact while being thin and light, is foldable or bendable so as to be manufactured in a variety of shapes and is applicable to an industrial field where application of an existing glass substrate display is restricted or impossible.

For example, fields of new portable IT products such as electronic books capable of replacing publications such as magazines, textbooks, books, comics, subminiature PCs including a display which is carriable while being folded or rolled, smart cards capable of verifying information in real time, and the like may be application fields of flexible displays. In addition, since a flexible plastic substrate is used, flexible displays are additionally applicable to fields of clothes fashions and medical diagnosis.

However, when only a foldable portable device (refer to FIG. 1) including the flexible display is carried, the display may be easily damaged by pressing, scratching, and the like. Accordingly, except a part of the foldable portable device which is folded by a foldable or bendable property, a protection case is mounted on other parts. However, it is not possible to mount an additional case on the folded part due to deformation thereof such that there is a problem of not being protected from stretching, impact, and the like.

Also, the foldable portable device has a negative effect in that the protection case is mounted in a shape of separately surrounding each of upper, lower, left, and right sides of a rear surface of front and rear sides except the folded part instead of surrounding an entire rear surface like a protection case of a conventional portable device such that the protection case moves in any one of left and right directions and is separated.

To remedy such problems, a cell phone case having a structure shown in FIG. 2 has been developed.

The conventional cell phone case shown in FIG. 2 has a structure in which a plurality of case covers 30 are connected by a plate spring 50 and then the conventional cell phone case is mounted on an outer surface of a cell phone.

The conventional cell phone case shown in FIG. 2 has a problem of being detached from a cell phone while an operation of folding or unfolding the cell phone is performed. Also, since the conventional cell phone case shown in FIG. 2 employs only a structure of simply surrounding the outer surface of the cell phone, unexpected impact applied from the outside is not effectively absorbed such that the impact applied from the outside may be transferred to the cell phone and cause damage to the cell phone. Additionally, there is a problem in the conventional cell phone shown in FIG. 2 in that the structure thereof is too simple to accommodate a card desired by the user.

Accordingly, it is necessary to solve the above problems according to the related art.

SUMMARY OF THE INVENTION

The present invention is directed to providing a card accommodation cell phone case for a foldable cell phone which is capable of stably protecting a cell phone while a folding or unfolding operation is performed and of stably accommodating a card so as not to lose the card due to an unintended external force.

According to an aspect of the present invention, there is provided a card accommodation cell phone case including an upper body portion mounted to surround an upper side of a cell phone to be mounted where a camera lens is located on the basis of a folded part of the cell phone, a lower body portion mounted to surround a lower side of the cell phone to be mounted where the upper body portion is not mounted on the basis of the folded part of the cell phone, an upper end buffer portion mounted on an inner surface of the upper body portion, disposed on a part coming into contact with an upper end of the cell phone, configured to space the inner surface of the upper body portion at a certain distance apart from the upper end of the cell phone, and on which an upper end buffer protrusion portion protruding by a certain length is formed in a direction toward a corner of the upper body portion, a lower end buffer portion mounted on an inner surface of the lower body portion, disposed on a part coming into contact with a lower end of the cell phone, configured to space the inner surface of the lower body portion at a certain distance apart from the lower end of the cell phone, and on which a lower end buffer protrusion portion protruding by a certain length is formed in a direction toward a corner of the lower body portion, and a card accommodation portion recessed by a certain depth from the inner surface of the lower body portion with the same shape as a card to be accommodated and in which a card inlet is formed at a position coming into contact with the upper body portion.

The upper body portion may include an upper inner surface configured to form an accommodation space having a certain volume so as to allow the upper side of the cell phone to be mounted therein while being surrounded thereby, a lens exposure portion formed to pass through one surface to allow the camera lens of the cell phone to be mounted to be exposed outward, and a button exposure portion formed to be recessed from one surface to allow a button formed on a side of the cell phone to be mounted to be exposed outward.

The lower body portion may include a lower inner surface configured to form an accommodation space having a certain volume so as to allow the lower side of the cell phone to be mounted therein while being surrounded thereby, a card-insertion inducing plate having a plate-shaped structure, located on a plane continued with the lower inner surface and configured to connect both sides of a card inlet, a card-insertion inducing groove formed in the lower inner surface to be recessed so as to allow the card-insertion inducing plate to be exposed outward, and a finger-grip groove having a semicircular structure, and formed to be continuously recessed in a central part of the card-insertion inducing groove so as to be grippable by a user's finger.

The card accommodation portion may include a side sliding groove formed to be recessed by a certain depth from both sides of a structure recessed by a certain depth in the inner surface of the lower body portion, to be continued in a direction in which the card to be accommodated is inserted, and to surround parts of both sides of the card to be accommodated and an end insertion groove formed to be recessed by a certain depth from an end surface of a structure recessed by a certain depth in the inner surface of the lower body portion and to surround a part of an end of the card to be accommodated.

The upper end buffer portion may include an upper end buffer body portion formed to have the same structure as the inner surface of the upper body portion and including a flexible material having a certain level of elastic restorability, an upper end buffer protrusion portion formed to have a certain height and integrally with both ends of the upper end buffer body portion, protruding outward by a certain length and exposed through a corner of the upper body portion, and including a flexible material having a certain level of elastic restorability, and an upper end contact portion formed on an inner surface of the upper end buffer body portion and having the same structure as an upper end surface of the cell phone.

In this case, the upper end buffer protrusion portion may be a structure that is expandable by a certain volume due to air injected from the outside and include a material having a certain level of elastic restorability. The upper end contact portion may be a structure that is expandable by a certain volume due to air injected from the outside and include a material having a certain level of elastic restorability. The upper end buffer portion may further include an upper manual pumping portion built in one surface of the upper end buffer portion and configured to inject outside air into the upper end buffer protrusion portion and the upper end contact portion through handle manipulation by a user.

The upper end buffer portion may include a lower end buffer body portion formed to have the same structure as the inner surface of the lower body portion and including a flexible material having a certain level of elastic restorability, a lower end buffer protrusion portion formed to have a certain height and integrally with both ends of the lower end buffer body portion, protruding outward by a certain length and exposed through a corner of the lower body portion, and including a flexible material having a certain level of elastic restorability, and a lower end contact portion formed on an inner surface of the lower end buffer body portion and having the same structure as a lower end surface of the cell phone.

In this case, the lower end buffer protrusion portion may be a structure that is expandable by a certain volume due to air injected from the outside and include a material having a certain level of elastic restorability. The lower end contact portion may be a structure that is expandable by a certain volume due to air injected from the outside and include a material having a certain level of elastic restorability. The lower end buffer portion may further include a lower manual pumping portion built in one surface of the lower end buffer portion and configured to inject outside air into the lower end buffer protrusion portion and the lower end contact portion through handle manipulation by a user.

The card accommodation cell phone case may include a control portion built in the upper body portion, in wireless connection with the cell phone mounted therein, and configured to control an operation of a light output sticker through a power line according to a control value input from the connected cell phone, a power storage portion built in the upper body portion as a stacked structure, wirelessly charged from the outside, and configured to provide power to the control portion and the power line, a plurality of power lines printed with an electroconductive ink on an outer surface of the upper body portion while being spaced at certain intervals and electrically connected to the power storage portion, and the light output sticker having a film structure selectively attached to a random position of a surface of the upper body portion and configured to receive power from the power lines protruding from the surface of the upper body portion and to operate according to a control signal transmitted from the control portion so as to emit light in preset colors and light emitting patterns.

The card accommodation cell phone case may include a control portion built in the lower body portion, in wireless connection with the cell phone mounted therein, and configured to control an operation of a light output sticker through a power line according to a control value input from the connected cell phone, a power storage portion built in the lower body portion as a stacked structure, wirelessly charged from the outside, and configured to provide power to the control portion and the power line, a plurality of power lines printed with an electroconductive ink on an outer surface of the lower body portion while being spaced at certain intervals and electrically connected to the power storage portion, and the light output sticker having a film structure selectively attached to a random position of a surface of the lower body portion and configured to receive power from the power lines protruding from the surface of the lower body portion and to operate according to a control signal transmitted from the control portion so as to emit light in preset colors and light emitting patterns.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the attached drawings. Before this, the terms or words used in the specification and the claims should not be limited to general or lexical meanings and should be construed as meanings and concepts coinciding with the technical concept of the present invention.

Throughout the specification, when a member is stated as being located "on" another member, not only the member comes into contact with the other member but also still another member is present therebetween. Throughout the specification, when a portion is stated as "including" a component, unless defined particularly otherwise, it means that the portion may not exclude another component but may further include another component.

Figure 1:
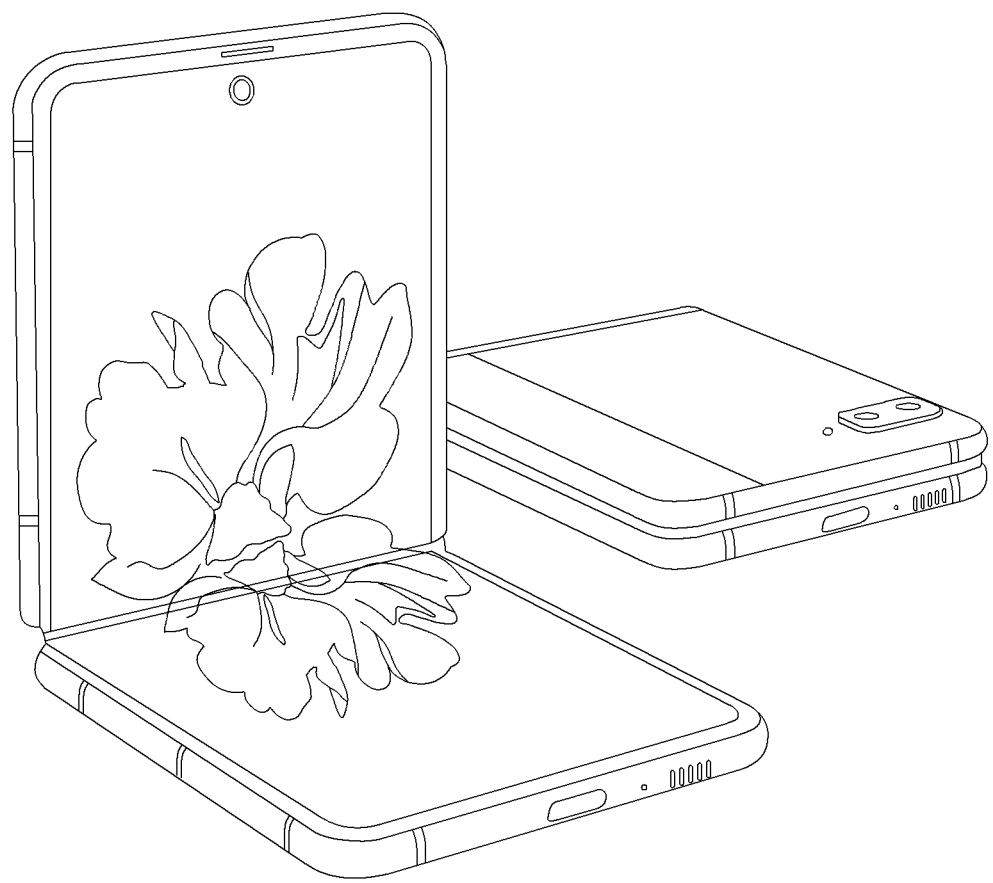
FIG. 1 is a photo illustrating a foldable cell phone.
Figure 2:
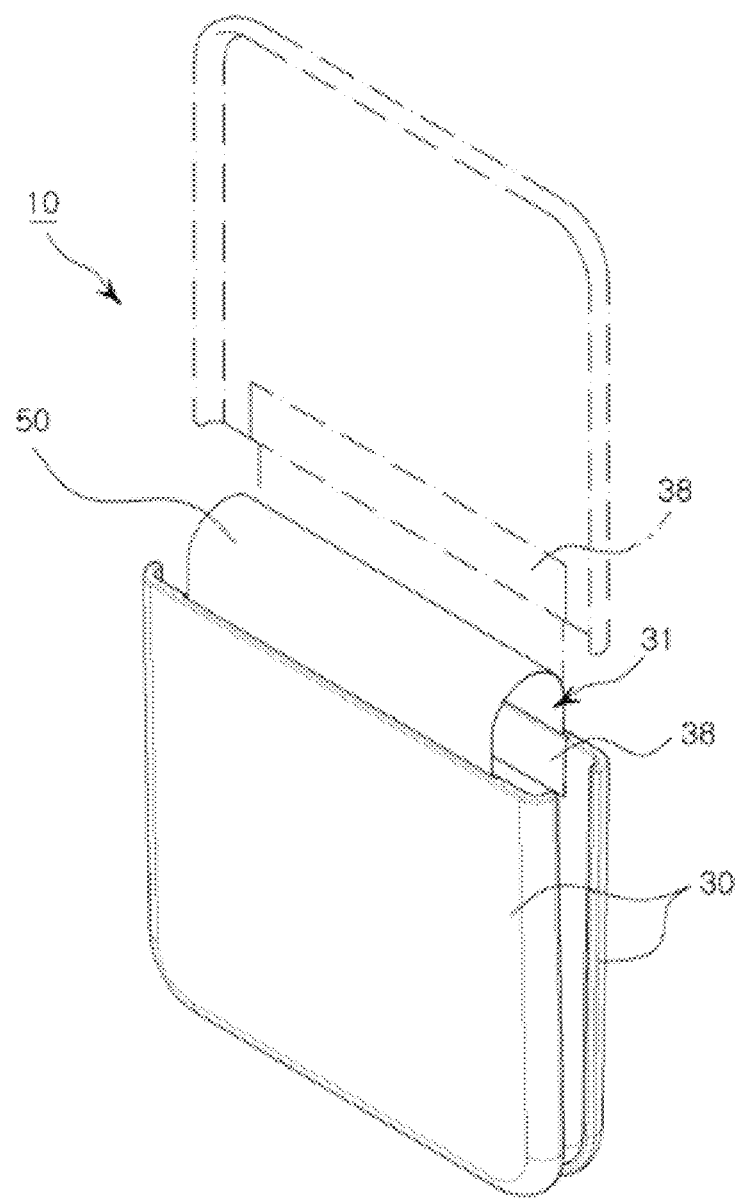
FIG. 2 is a perspective view illustrating a cell phone case for a foldable cell phone according to a related art.
Figure 3:
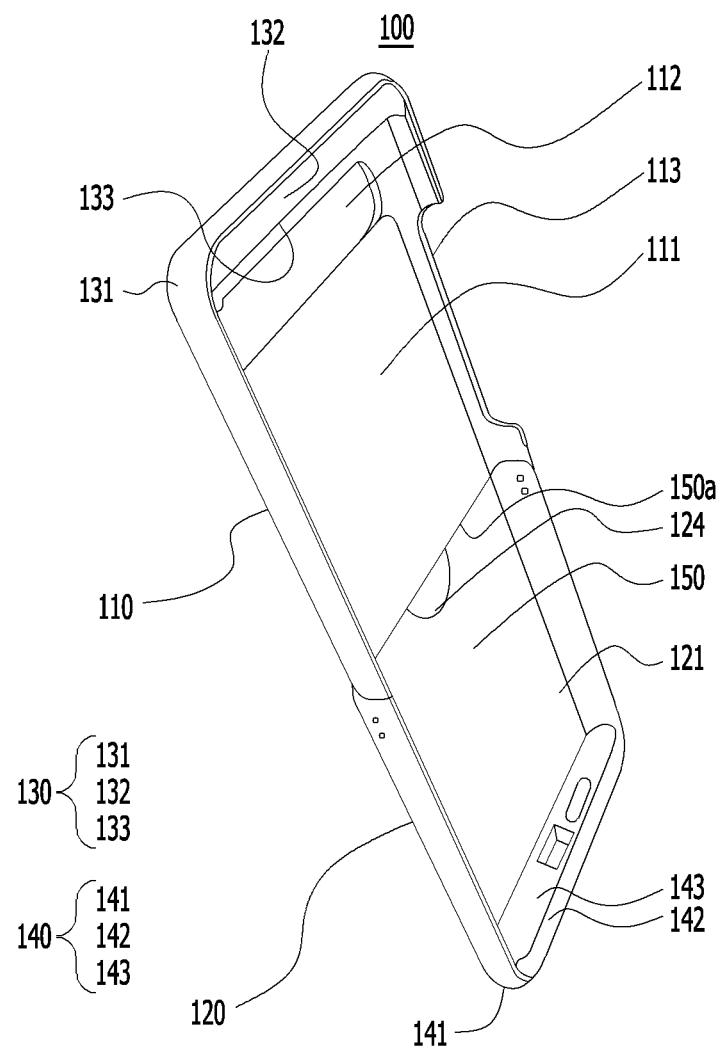
FIG. 3 is a photo illustrating a card accommodation cell phone case according to one embodiment of the present invention.

FIG. 3 illustrates a photo of a card accommodation cell phone case according to one embodiment of the present invention.

Referring to FIG. 3, a card accommodation cell phone case 100 for a foldable cell phone according to the embodiment including an upper body portion 110, a lower body portion 120, an upper end buffer portion 130, a lower end buffer portion 140, and a card accommodation portion 150 which have particular structures so as to stably mount a foldable cell phone, to stably protect the cell phone while a folding or unfolding operation is performed, and to stably accommodate a card so as not to lose the card due to an unintended external force may be provided.

Hereinafter, the respective components included in the card accommodation cell phone case 100 according to the embodiment will be described in detail with reference to the drawings.

The upper body portion 110 according to the embodiment may be mounted to surround an upper side of the cell phone to be mounted therein in which a camera lens is located on the basis of a foldable part of the cell phone.

In detail, the upper body portion 110 may include an upper inner surface 111, a lens exposure portion 112, and a button exposure portion 113 which have particular structures. The upper inner surface 111 may form an accommodation space having a certain volume to allow the upper side of the cell phone to be mounted therein while being surrounded thereby. The lens exposure portion 112 may be formed to pass through one surface so as to allow the camera lens of the cell phone to be mounted to be exposed outward. Also, the button exposure portion 113 may be formed to be recessed into one surface so as to allow a button formed on a side of the cell phone to be mounted to be exposed outward.

The lower body portion 120 may be mounted to surround a lower side of the cell phone where the upper body portion 110 is not mounted on the basis of the foldable part of the cell phone to be mounted.

The upper end buffer portion 130 is a component mounted on an inner surface of the upper body portion 110 and disposed on a part coming into contact with an upper end of the cell phone so as to space the inner surface of the upper body portion 110 at a certain distance apart from the upper end of the cell phone and includes an upper end buffer protrusion portion 131 protruding to a certain length in a direction toward a corner of the upper body portion 110.

The lower end buffer portion 140 is a component mounted on an inner surface of the lower body portion 120 and disposed on a part coming into contact with a lower end of the cell phone so as to space the inner surface of the lower body portion 120 at a certain distance apart from the lower end of the cell phone and includes a lower end buffer protrusion portion 141 protruding to a certain length in a direction toward a corner of the lower body portion 120.

In this case, according to the embodiment, the card accommodation cell phone case including the upper end buffer portion 130 which includes an upper end buffer body portion 132, a buffer protrusion portion, and an upper end contact portion 133 which have particular structures and the lower end buffer portion 140 which includes a lower end buffer body portion 142, a buffer protrusion portion, and a lower end contact portion 143 so as to effectively absorb impact applied from the outside and prevent the impact from being transferred to the cell phone mounted therein may be provided.

Figure 4:
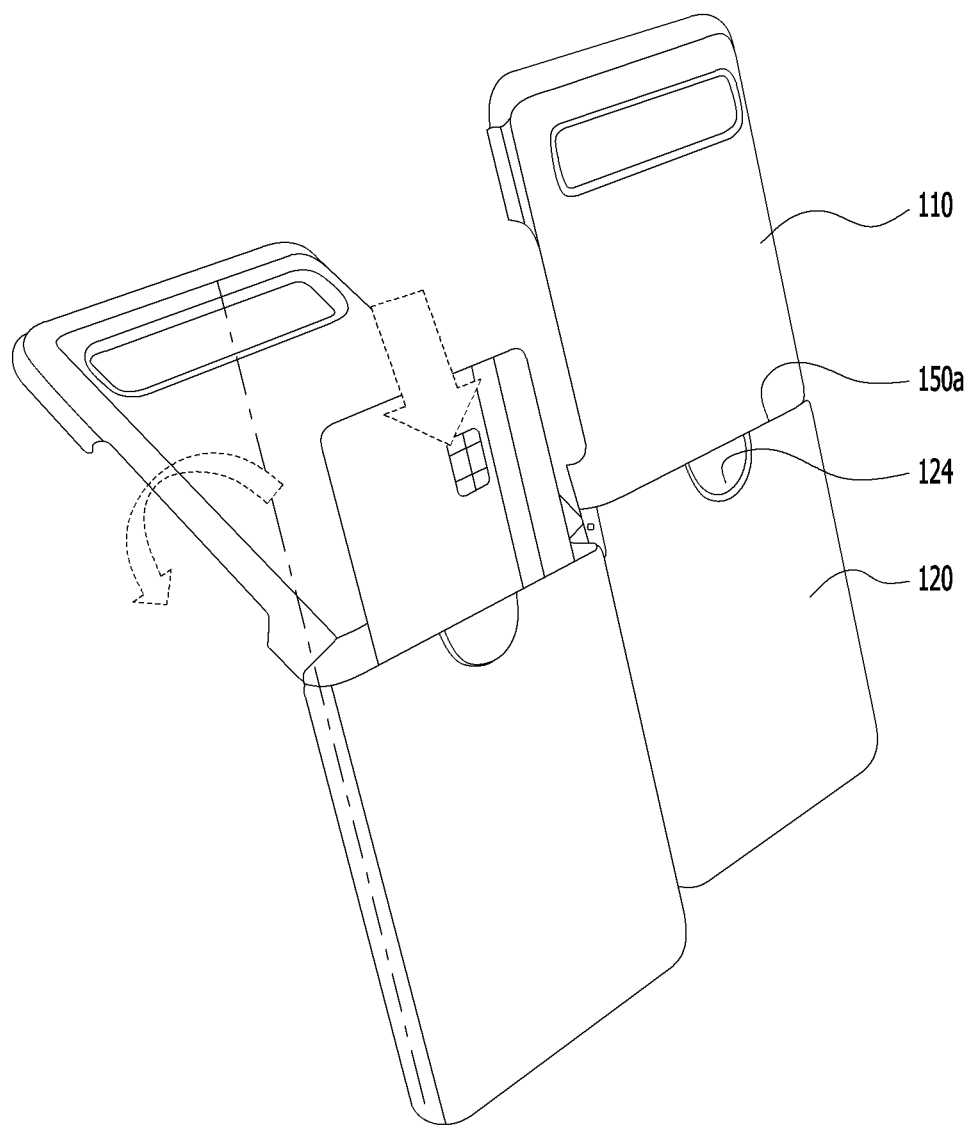
FIG. 4 is a photo illustrating a state in which a card is accommodated in the card accommodation cell phone case shown in FIG. 3.
Figure 5:
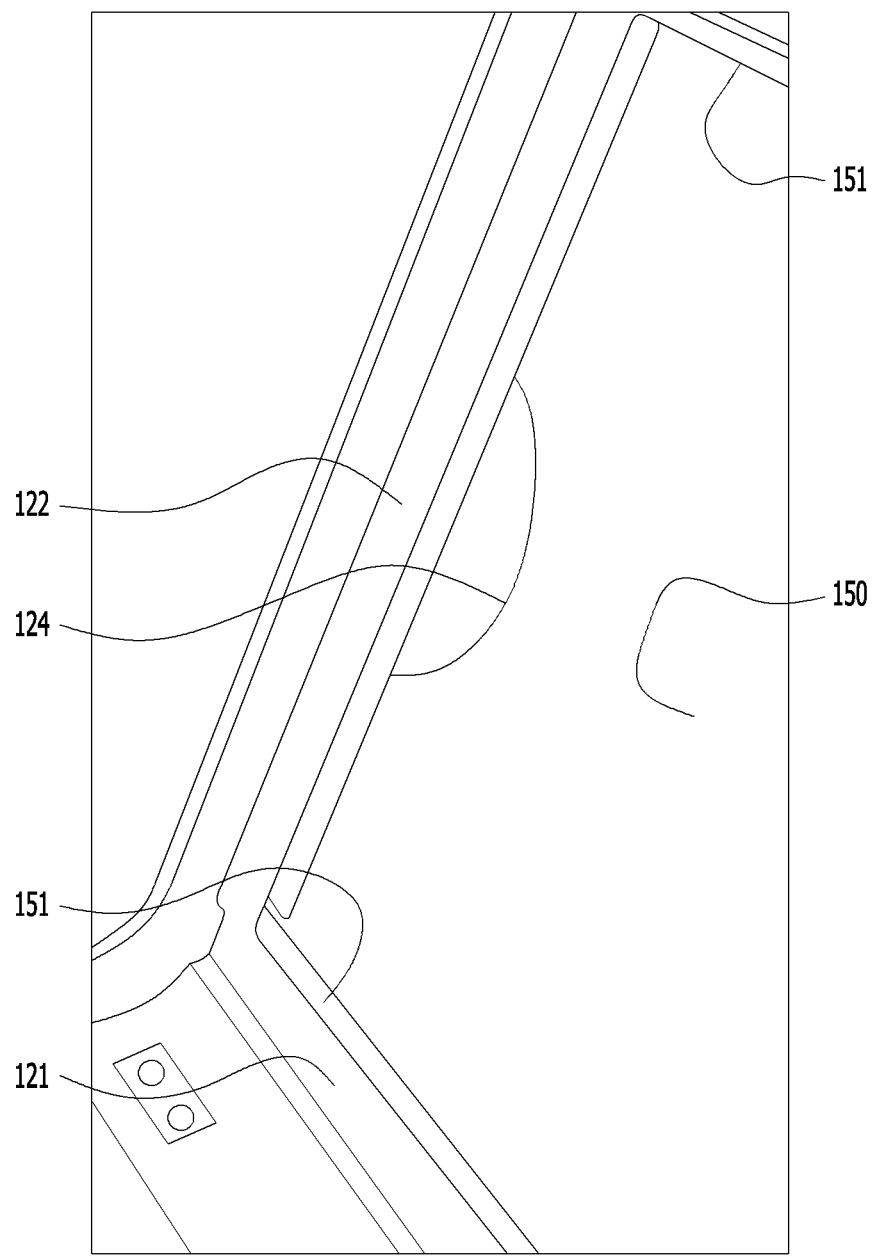
FIG. 5 is a partial enlarged photo illustrating a state of a card inlet of a card accommodation portion according to one embodiment of the present invention when viewed from inside.
Figure 6:
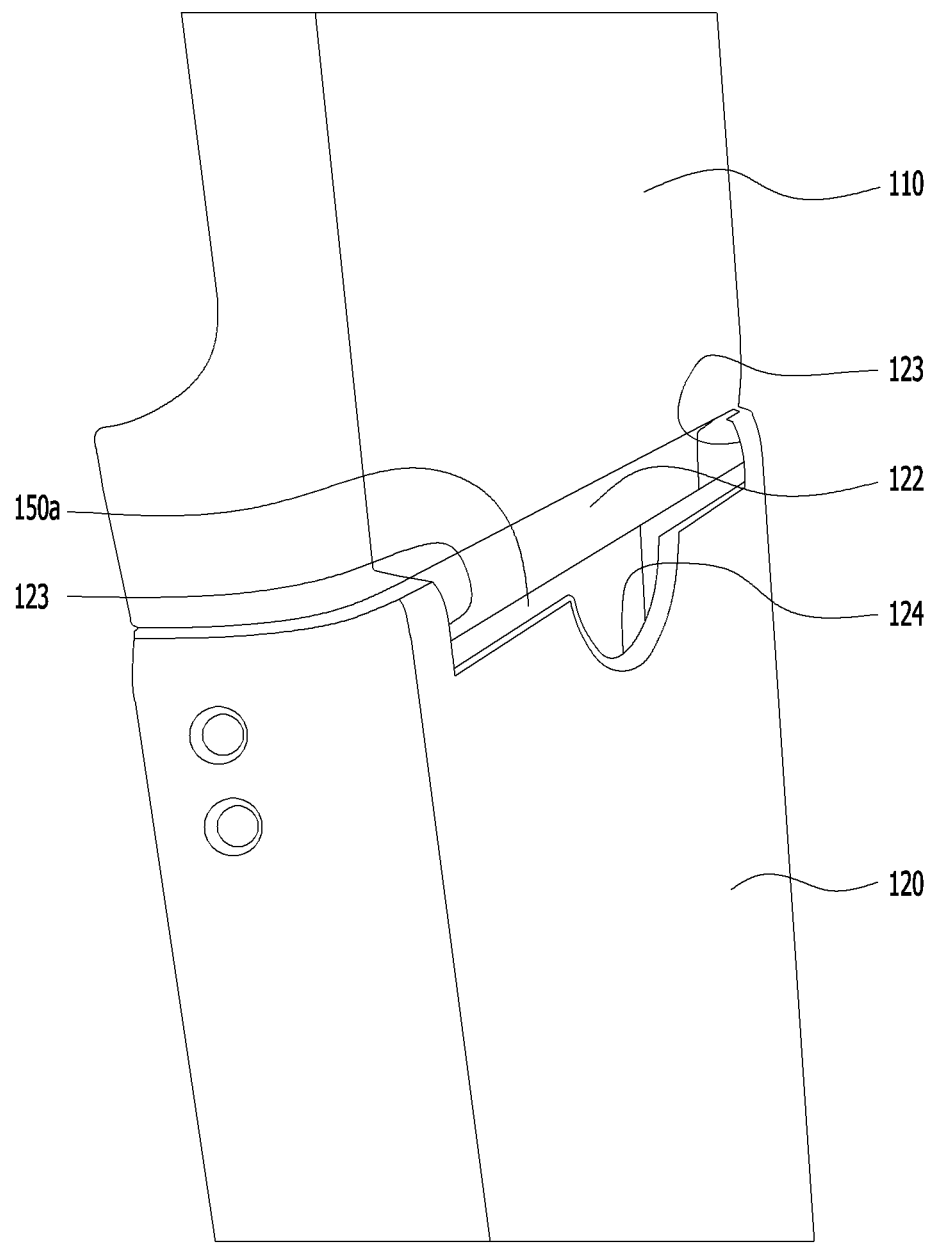
FIG. 6 is a partial enlarged photo illustrating a state of the card inlet of the card accommodation portion shown in FIG. 5 when viewed from outside.

Also, the card accommodation portion 150 according to the embodiment has a structure recessed from an inner surface of the lower body portion at a certain depth in the same shape as that of a card to be accommodated and may include a card inlet 150a formed at a position coming into contact with the upper body portion 110. FIG. 4 is a photo illustrating a state in which a card is accommodated in the card accommodation cell phone case shown in FIG. 3, FIG. 5 is a partial enlarged photo illustrating a state of the card inlet of the card accommodation portion according to one embodiment of the present invention when viewed from inside, and FIG. 6 is a partial enlarged photo illustrating a state of the card inlet of the card accommodation portion shown in FIG. 5 when viewed from outside.

Figure 7:
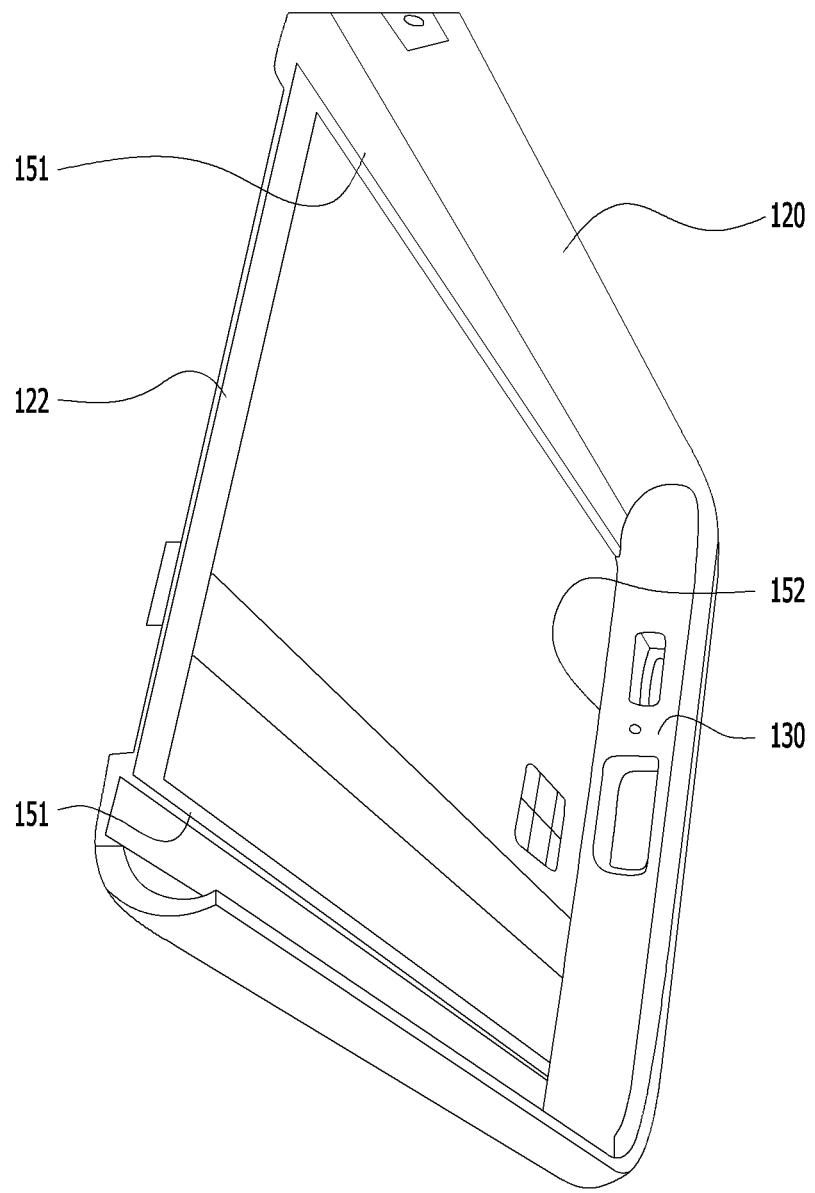
FIG. 7 is a photo illustrating a state in which the card is inserted into the card accommodation portion according to one embodiment of the present invention when viewed from inside.
Figure 8A:
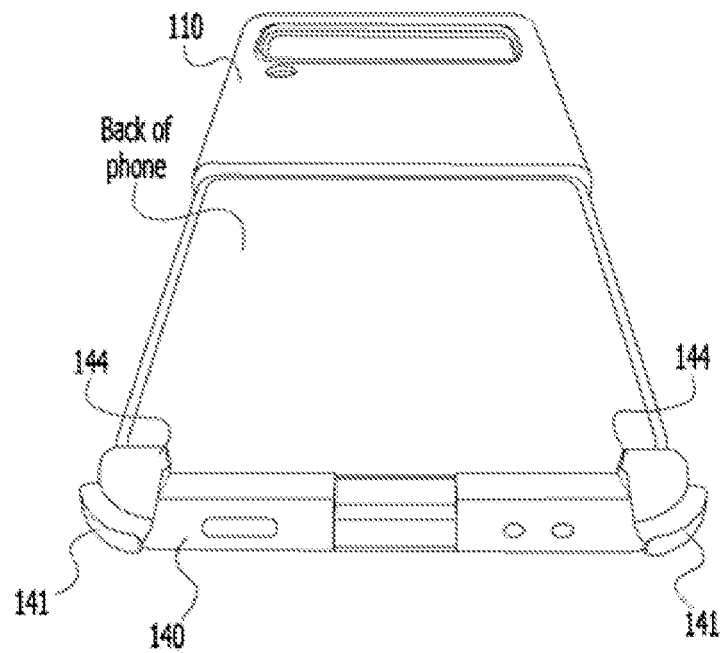
FIGS. 8A and 8B are photos illustrating a state in which a cell phone is mounted in a card accommodation cell phone case according to another embodiment of the present invention and then a lower body portion is removed and a state in which one corner of the card is inserted into and fixed to a card fixing protrusion of a lower end buffer portion, respectively.
Figure 8B:
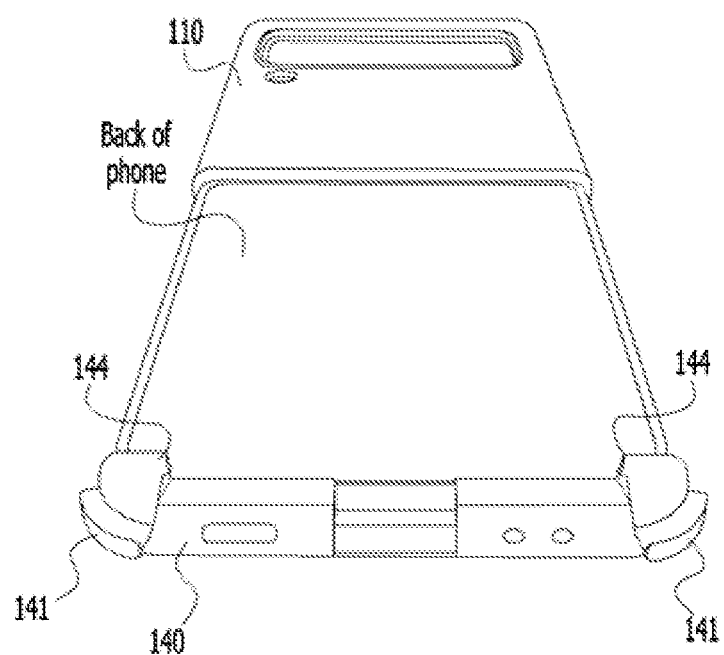

Also, FIG. 7 is a photo illustrating a state in which the card is inserted into the card accommodation portion according to one embodiment of the present invention when viewed from inside, and FIGS. 8A and 8B are photos illustrating a state in which a cell phone is mounted in a card accommodation cell phone case according to another embodiment of the present invention and then a lower body portion is removed and a state in which one corner of the card is inserted into and fixed to a card fixing protrusion of a lower end buffer portion, respectively. Also, FIG. 9 is a perspective view illustrating a finger-push groove formed in the lower body portion of the card accommodation cell phone case according to another embodiment of the present invention, and FIG. 10 is a photo illustrating a state in which the card is inserted into the card accommodation portion according to one embodiment of the present invention when viewed from outside.

Referring to the drawings, the lower body portion 120 according to the embodiment may be a component including a lower inner surface 121, a card-insertion inducing plate 122, a card-insertion inducing groove 123, and a finger-grip groove 124 which have particular structures. In detail, the lower inner surface 121 may form an accommodation space having a certain volume to allow the lower side of the cell phone to be mounted to be mounted therein while being surrounded thereby. The card-insertion inducing plate 122 is a component located in a plane that is continuous with the lower inner surface 121 and may have a plate-shaped structure connecting both sides of the card inlet. The card-insertion inducing groove 123 is a component formed in the lower inner surface 121 and may have a structure recessed to allow the card-insertion inducing plate 122 to be exposed outward. Also, the finger-grip groove 124 is a component formed in the center of the card-insertion inducing groove 123 to be continuously recessed and may have a semicircular structure grippable by a user's finger.

Figure 9:
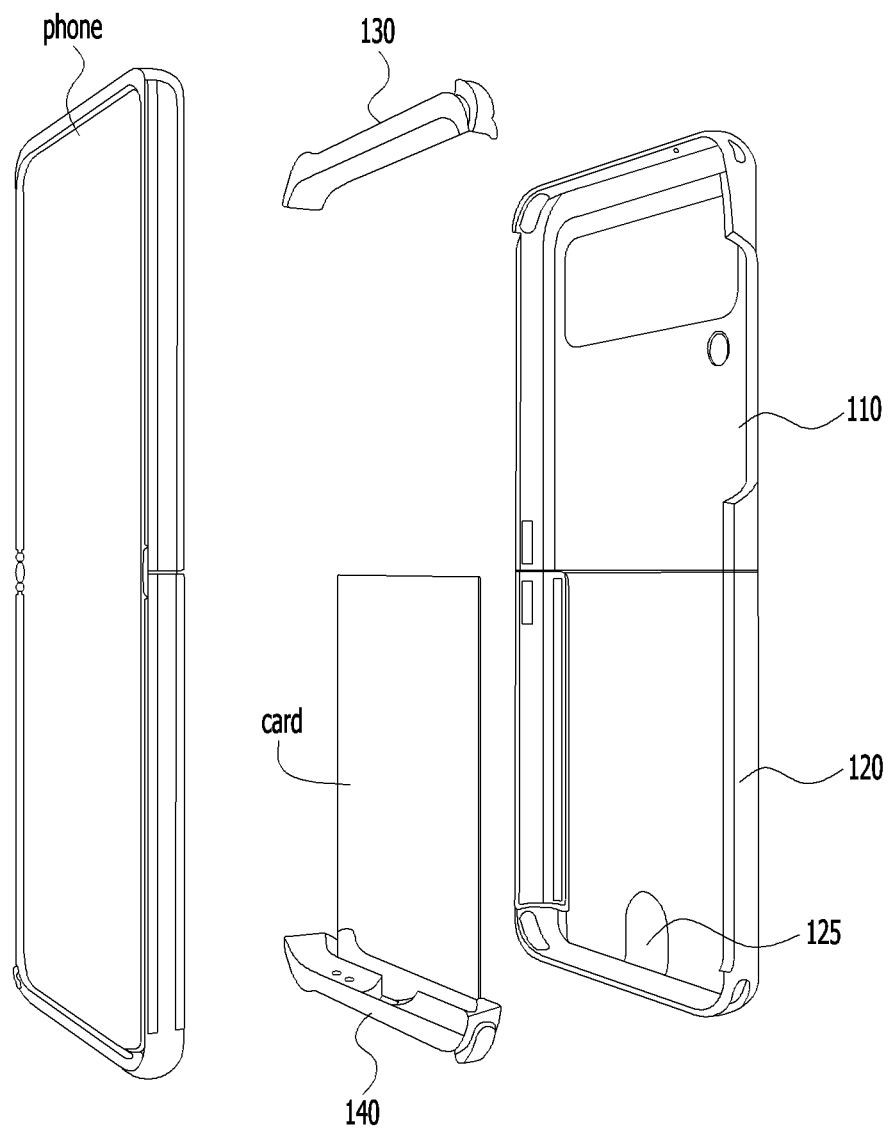
FIG. 9 is a perspective view illustrating a finger-push groove formed in the lower body portion of the card accommodation cell phone case according to another embodiment of the present invention.
Figure 10:
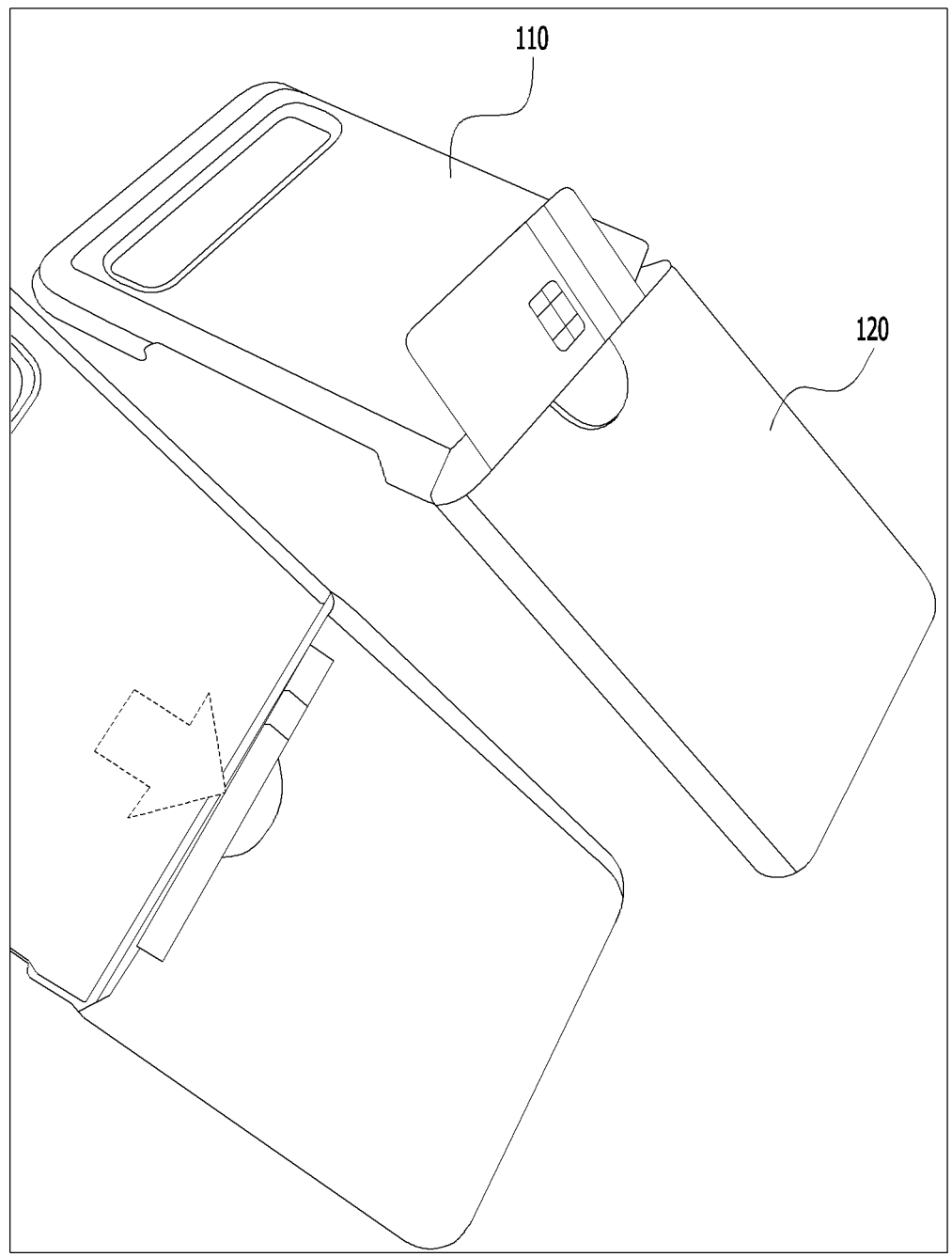
FIG. 10 is a photo illustrating a state in which the card is inserted into the card accommodation portion according to one embodiment of the present invention when viewed from outside.

On a case-by-case basis, as shown in FIG. 9, a finger-push groove 125 having a structure recessed at a certain depth from a position symmetrical to the finger-grip groove 124 may be formed on a lower end of the lower body portion 120. A user may easily take out the card by lifting up a lower end of the accommodated card using the finger-push groove 125.

Referring to the drawings, the card accommodation portion 150 according to the embodiment may be a component further including a side sliding groove 151 and an end insertion groove 152 which have particular structures. In detail, the side sliding groove 151 is a component formed to be recessed by a certain depth from both surfaces of a structure recessed from the inner surface of the lower body portion 120 by a certain depth, and has a structure continued in a direction in which the card to be accommodated is inserted, and may be formed to surround parts of both sides of the card to be accommodated. The end insertion groove 152 is a component formed to be recessed by a certain depth from an end surface of a structure recessed from the inner surface of the lower body portion 120 by a certain depth and may be formed to surround a part of an end surface of the card to be accommodated. Also, a card fixing protrusion 144 may be formed on the lower end buffer portion 140 to protrude therefrom by a certain length as shown in FIG. 8A so as to surround and fix one corner of the card as shown in FIG. 8B.

In this case, according to the embodiment, the card accommodation cell phone case including the lower inner surface 121, the card-insertion inducing plate 122, the card-insertion inducing groove 123, the finger-grip groove 124, the side sliding groove 151, and the end insertion groove 152 which have particular structures so as to prevent the card accommodated in the card accommodation portion 150 from being detached outward due to an unintended external force while an operation of folding or unfolding a central part of the cell phone is performed and to stably accommodate the card in the card accommodation portion 150 may be provided.

Figure 11:
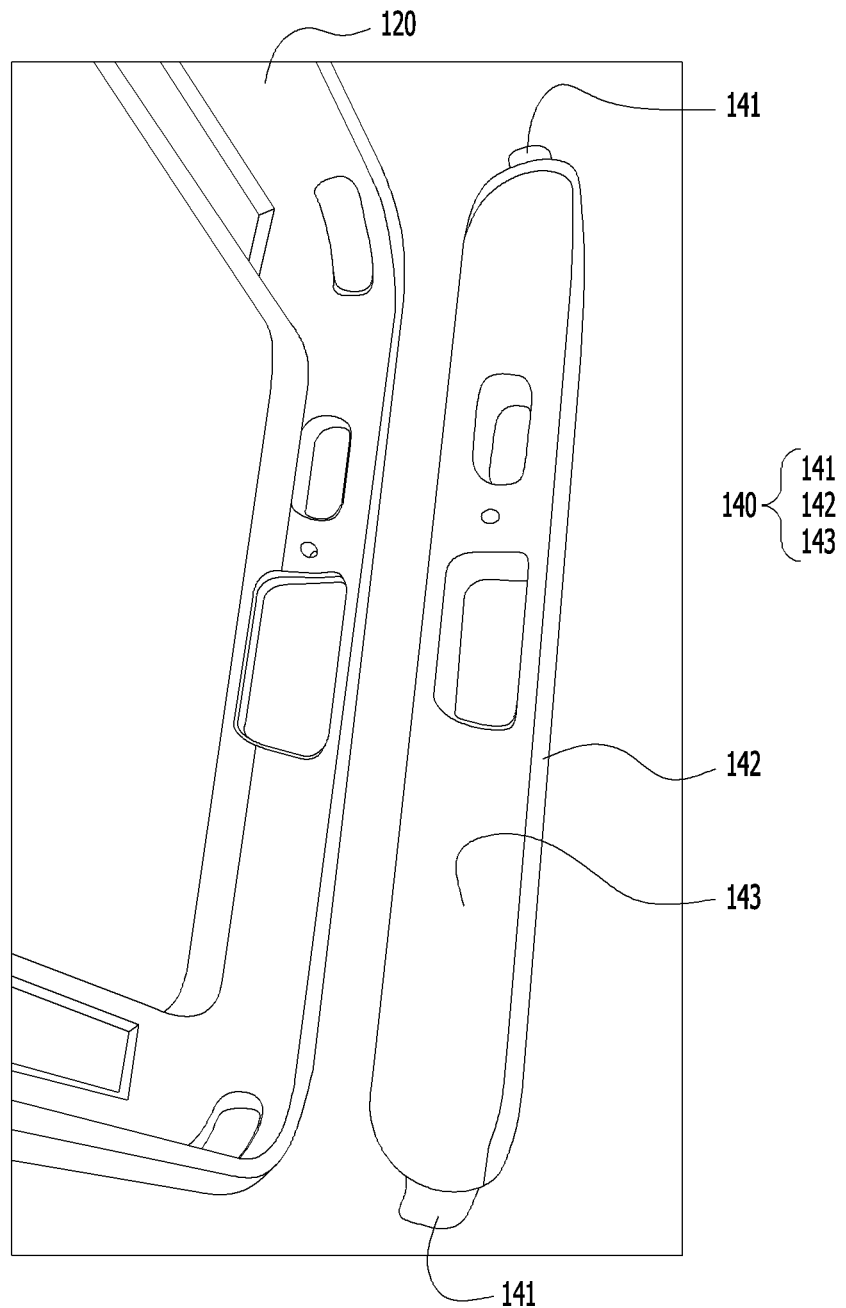
FIG. 11 is a photo illustrating a lower end buffer portion according to one embodiment of the present invention.
Figure 12:
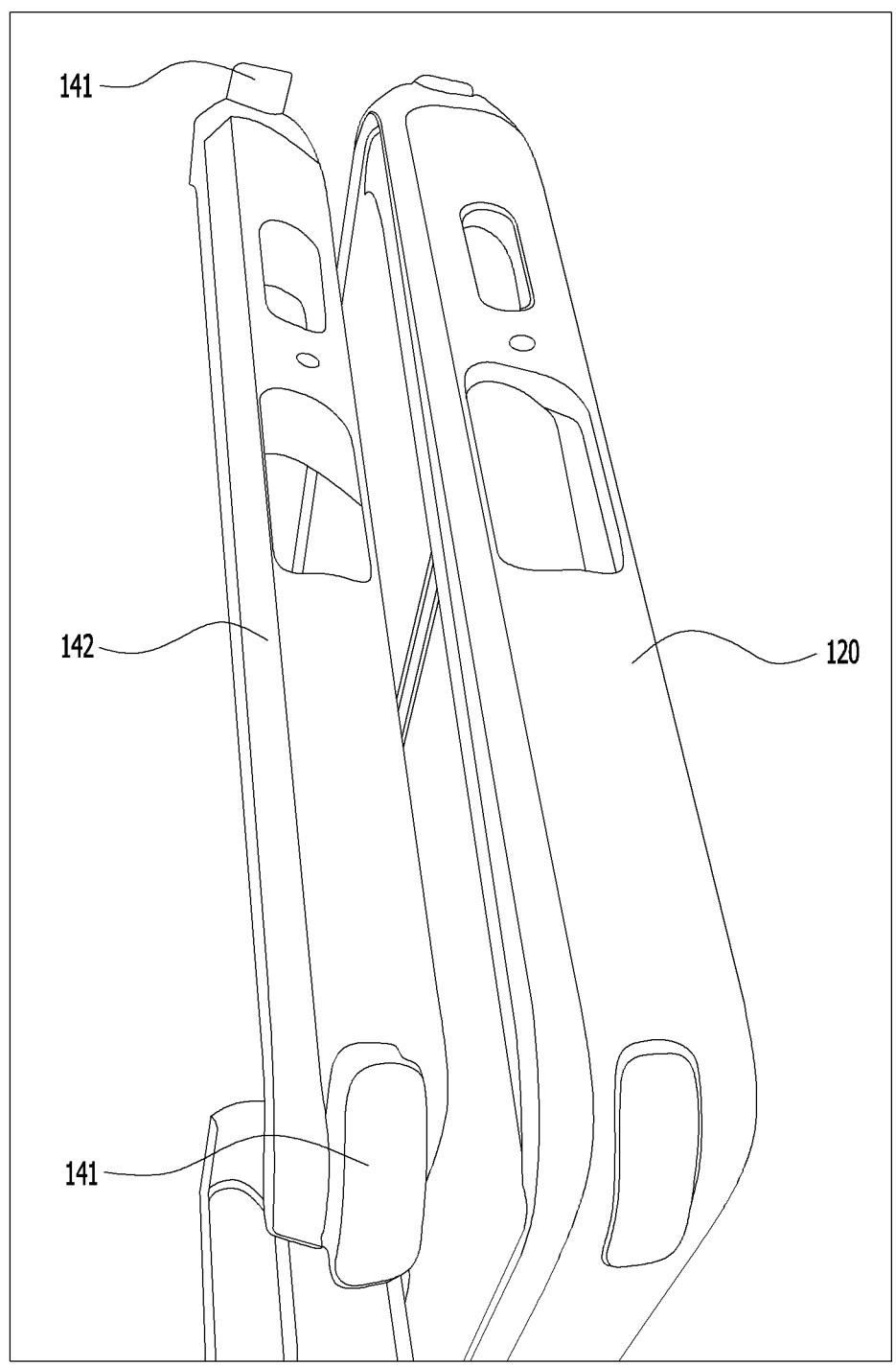
FIG. 12 is a photo illustrating a state of the lower end buffer portion of FIG. 11 when viewed in another direction.

FIG. 11 is a photo illustrating the lower end buffer portion according to one embodiment of the present invention, and FIG. 12 is a photo illustrating a state of the lower end buffer portion of FIG. 11 when viewed in another direction.

Referring to these drawings and FIG. 3, the upper end buffer portion 130 according to the embodiment may be a component including the upper end buffer body portion 132, the upper end buffer protrusion portion 131, and the upper end contact portion 133 that have particular structures. In detail, the upper end buffer body portion 132 is a component formed to have the same structure as the inner surface of the upper body portion 110 and may include a flexible material having a certain level of elastic restorability. The upper end buffer protrusion portion 131 is a component having an integral structure with a certain height from both ends of the upper end buffer body portion 132, protruding by a certain length, and exposed through the corner of the upper body portion 110 and may be formed of a flexible material having a certain level of elastic restorability. Also, the upper end contact portion 133 is a component formed on an inner surface of the upper end buffer body portion 132 and may have the same structure as an upper end surface of the cell phone.

In some cases, the upper end buffer protrusion portion 131 has a structure that is expandable by a certain volume due to air injected from the outside and may include a material having a certain level of elastic restorability. Also, the upper end contact portion 133 has a structure that is expandable by a certain volume due to air injected from the outside and may include a material having a certain level of elastic restorability. Here, an upper manual pumping portion (not shown) may be built in one surface of the upper end buffer portion 130. The upper manual pumping portion may inject outside air into the upper end buffer protrusion portion and the upper end contact portion 133 through handle manipulation of the user.

Meanwhile, the lower end buffer portion 140 according to the embodiment may include the lower end buffer body portion 142, the lower end buffer protrusion portion 141, and the lower end contact portion 143 which have particular structures.

In detail, the lower end buffer body portion 142 is a component formed to have the same structure as the inner surface of the lower body portion 120 and may include a flexible material having a certain level of elastic restorability. The lower end buffer protrusion portion 141 is a component having an integral structure with a certain height from both ends of the lower end buffer body portion 142, protruding by a certain length, and exposed through the corner of the lower body portion 120 and may be formed of a flexible material having a certain level of elastic restorability. Also, the lower end contact portion 143 is a component formed on an inner surface of the lower end buffer body portion 142 and may have the same structure as a lower end surface of the cell phone.

In some cases, the lower end buffer protrusion portion 141 has a structure expandable by a certain volume due to air injected from the outside and may include a material having a certain level of elastic restorability. Also, the lower end contact portion 143 has a structure expandable by a certain volume due to air injected from the outside and may include a material having a certain level of elastic restorability. Here, a lower manual pumping portion (not shown) may be built in one surface of the lower end buffer portion 140. The lower manual pumping portion may inject outside air into the lower end buffer protrusion portion and the lower end contact portion 143 through handle manipulation of the user.

In this case, according to the embodiment, the card accommodation cell phone case including the upper end buffer protrusion portion, the upper end contact portion 133, the upper manual pumping portion, the lower end buffer protrusion portion, the lower end contact portion 143, and the lower manual pumping portion which have particular structures so as to absorb impact applied from the outside by expanding the upper end buffer protrusion portion, the upper end contact portion 133, the lower end buffer protrusion portion, and the lower end contact portion 143 with a certain level of pressure and to prevent the impact from being transferred to the cell phone mounted therein may be provided.

Figure 13:
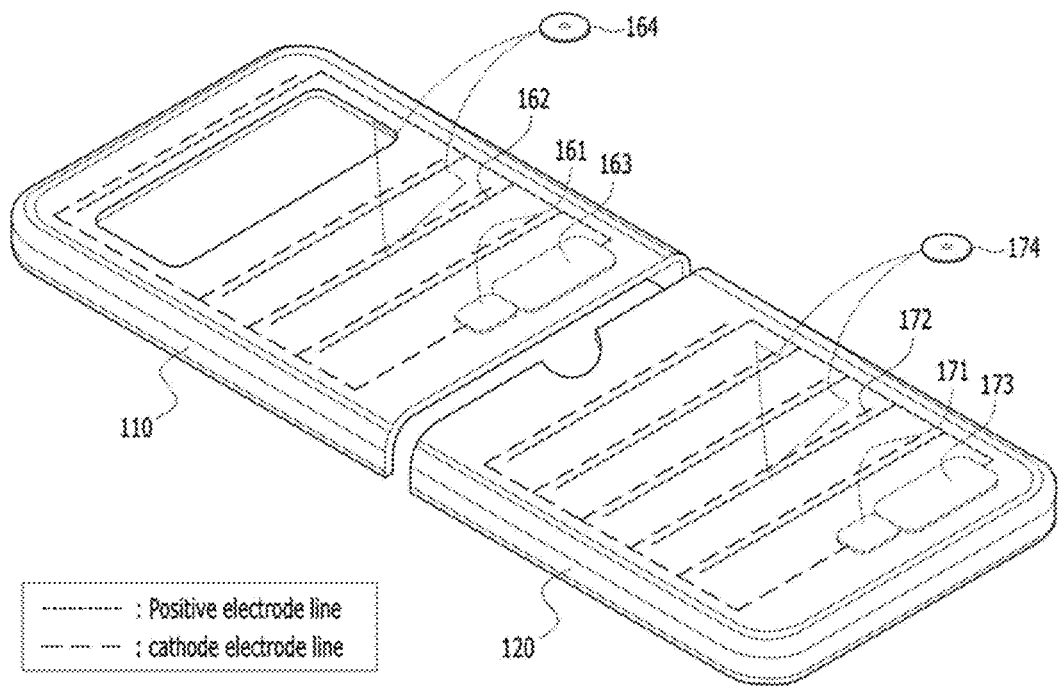
FIG. 13 is a perspective view illustrating a control portion, a power line, a power storage portion, and a light output sticker of the card accommodation cell phone case according to another embodiment of the present invention.

FIG. 13 illustrates a perspective view illustrating a control portion, a power line, a power storage portion, and a light output sticker of the card accommodation cell phone case according to another embodiment of the present invention.

Referring to FIG. 13 and back to FIG. 3, the card accommodation cell phone case 100 according to the embodiment may include control portions 161 and 171, power storage portions 163 and 173, power lines 162 and 172, and light output stickers 164 and 174 which perform particular functions.

In detail, the control portion 161 built in the upper body portion 110 according to the embodiment may be in wireless connection with the cell phone mounted therein and may control an operation of the light output sticker 164 through the power line 162 according to a control value input from the connected cell phone. Also, the control portion 171 built in the lower body portion 120 may be in wireless connection with the cell phone mounted therein and may control an operation of the light output sticker 174 through the power line 172 according to a control value input from the connected cell phone.

The power storage portion 163 built in the upper body portion 110 as a stacked structure may be wirelessly charged from the outside and provide power to the control portion 161 and the power line 162. Also, the power storage portion 173 built in the lower body portion 120 as a stacked structure may be wirelessly charged from the outside and provide power to the control portion 171 and the power line 172.

Such power lines 162 printed on an outer surface of the upper body portion 110 while being spaced at certain intervals apart are components printed on the outer surface of the upper body portion 110 with an electroconductive ink as a plurality of lines spaced at certain intervals apart and may be electrically connected to the power storage portion 163. Also, such power lines 172 printed on an outer surface of the lower body portion 120 while being spaced at certain intervals apart are components printed on the outer surface of the lower body portion 120 with an electroconductive ink as a plurality of lines spaced at certain intervals apart and may be electrically connected to the power storage portion 173.

Also, the light output sticker 164 and 174 according to the embodiment are components selectively attached to random positions of a surface of the upper body portion 110 and a surface of the lower body portion 120 and may have a film structure configured to receive power from the power lines 162 and 172 protruding from the surfaces of the upper body portion 110 and the lower body portion 120 and operate according to control signals transmitted from the control portions 161 and 171 so as to emit light in preset colors and light emitting patterns.

In this case, according to the embodiment, the card accommodation cell phone case including the power storage portions 163 and 173, the power lines 162 and 172, and the light output stickers 164 and 174 which have particular structures and including the control portions 161 and 171 which perform a particular function so as to easily implement a variety of designs by easily outputting a light design to be represented on an outer surface of the card accommodation cell phone case using the cell phone according to the user's intention may be provided.

As described above, according to the present invention, a card accommodation cell phone case for a foldable cell phone which includes an upper body portion, a lower body portion, an upper end buffer portion, a lower end buffer portion, and a card accommodation portion which have particular structures so as to stably mount a foldable cell phone, to stably protect the cell phone while a folding or unfolding operation is performed, and to stably accommodate a card not to lose the card due to an unintended external force may be provided.

Also, according to the present invention, the card accommodation cell phone case including a lower inner surface, a card-insertion inducing plate, a card-insertion inducing groove, a finger-grip groove, a side sliding groove, and an end insertion groove which have particular structures so as to prevent a card accommodated in the card accommodation portion from being detached outward due to an unintended external force while an operation of folding or unfolding a central portion of the cell phone is performed and to stably accommodate the card in the card accommodation portion may be provided.

Also, according to the present invention, the card accommodation cell phone case including an upper end buffer portion including an upper end buffer body portion, a buffer protrusion portion, and an upper end contact portion which have particular structures and a lower end buffer portion including a lower end buffer body portion, a buffer protrusion portion, and a lower end contact portion so as to effectively absorb impact applied from the outside and to prevent the impact from being transferred to the mounted cell phone may be provided.

According to the present invention, the card accommodation cell phone case including an upper end buffer protrusion portion, an upper end contact portion, an upper manual pumping portion, a lower end buffer protrusion portion, a lower end contact portion, and a lower manual pumping portion so as to absorb impact applied from the outside by expanding the upper end buffer protrusion portion, the upper end contact portion according to the user's intention, the lower end buffer protrusion portion, and the lower end contact portion with a certain level of pressure and to prevent the impact from being transferred to the cell phone mounted therein may be provided.

According to the embodiment, the card accommodation cell phone case including power storage portions, power lines, and light output stickers which have particular structures and including control portions which perform a particular function so as to easily implement a variety of designs by easily outputting a light design to be represented on an outer surface of the card accommodation cell phone case using the cell phone according to the user's intention may be provided.

Only the particular embodiments of the present invention have been described above in the detailed description of the present invention. However, the present invention should be construed as being not limited to the particular form stated above in the detailed description and should be construed as including all modifications, equivalents, and substitutes within the range of the present invention defined by the attached claims.

That is, the present invention is not limited to the particular embodiment and description and a variety of modifications may be made by one of ordinary skill in the art without departing from the concept of the present invention and may be within the protective scope of the present invention.

What is claimed is:

1. A card accommodation cell phone case comprising:
    an upper body portion mounted to surround an upper side of a cell phone to be mounted where a camera lens is located on the basis of a folded part of the cell phone;
    a lower body portion mounted to surround a lower side of the cell phone to be mounted where the upper body portion is not mounted on the basis of the folded part of the cell phone;
    an upper end buffer portion mounted on an inner surface of the upper body portion, disposed on a part coming into contact with an upper end of the cell phone, configured to space the inner surface of the upper body portion at a certain distance apart from the upper end of the cell phone, and on which an upper end buffer protrusion portion protruding by a certain length is formed in a direction toward a corner of the upper body portion;
    a lower end buffer portion mounted on an inner surface of the lower body portion, disposed on a part coming into contact with a lower end of the cell phone, configured to space the inner surface of the lower body portion at a certain distance apart from the lower end of the cell phone, and on which a lower end buffer protrusion portion protruding by a certain length is formed in a direction toward a corner of the lower body portion;
    a card accommodation portion recessed by a certain depth from the inner surface of the lower body portion with the same shape as a card to be accommodated and in which a card inlet is formed at a position coming into contact with the upper body portion;
    a lower inner surface configured to form an accommodation space having a certain volume so as to allow the lower side of the cell phone to be mounted therein while being surrounded thereby;
    a card-insertion inducing plate having a plate-shaped structure, located on a plane continued with the lower inner surface, and configured to connect both sides of a card inlet;
    a card-insertion inducing groove formed in the lower inner surface to be recessed so as to allow the card-insertion inducing plate to be exposed outward; and
    a finger-grip groove having a semicircular structure and formed to be continuously recessed in a central part of the card-insertion inducing groove so as to be grippable by a user's finger.

2. The card accommodation cell phone case of claim 1, wherein the upper body portion comprises:
    an upper inner surface configured to form an accommodation space having a certain volume so as to allow the upper side of the cell phone to be mounted therein while being surrounded thereby;
    a lens exposure portion formed to pass through one surface to allow the camera lens of the cell phone to be mounted to be exposed outward; and
    a button exposure portion formed to be recessed from one surface to allow a button formed on a side of the cell phone to be mounted to be exposed outward.

3. The card accommodation cell phone case of claim 1, wherein the card accommodation portion comprises:
    a side sliding groove formed to be recessed by a certain depth from both sides of a structure recessed by a certain depth in the inner surface of the lower body portion, to be continued in a direction in which the card to be accommodated is inserted, and to surround parts of both sides of the card to be accommodated; and
    an end insertion groove formed to be recessed by a certain depth from an end surface of a structure recessed by a certain depth in the inner surface of the lower body portion and to surround a part of an end of the card to be accommodated.

4. The card accommodation cell phone case of claim 1, wherein the upper end buffer portion comprises:
    an upper end buffer body portion formed to have the same structure as the inner surface of the upper body portion and comprising a flexible material having a certain level of elastic restorability;
    an upper end buffer protrusion portion formed to have a certain height and integrally with both ends of the upper end buffer body portion, protruding outward by a certain length and exposed through a corner of the upper body portion, and comprising a flexible material having a certain level of elastic restorability; and
    an upper end contact portion formed on an inner surface of the upper end buffer body portion and having the same structure as an upper end surface of the cell phone, and
    wherein the lower end buffer portion comprises:
    a lower end buffer body portion formed to have the same structure as the inner surface of the lower body portion and comprising a flexible material having a certain level of elastic restorability;
    a lower end buffer protrusion portion formed to have a certain height and integrally with both ends of the lower end buffer body portion, protruding outward by a certain length and exposed through a corner of the lower body portion, and comprising a flexible material having a certain level of elastic restorability; and
    a lower end contact portion formed on an inner surface of the lower end buffer body portion and having the same structure as a lower end surface of the cell phone.

* * * * *